US006869986B1

(12) United States Patent
Millot et al.

(10) Patent No.: US 6,869,986 B1
(45) Date of Patent: Mar. 22, 2005

(54) INK COMPOSITION FOR INK JET PRINTING

(75) Inventors: Vincent Millot, Saint-Genis-Laval (FR); Pierre De Saint Romain, Valence (FR)

(73) Assignee: Imaje S.A., Bourg les Valence Cedex (FR)

(*) Notice: Subject to any disclaimer, the term of this patent is extended or adjusted under 35 U.S.C. 154(b) by 108 days.

(21) Appl. No.: 10/030,848

(22) PCT Filed: Jul. 28, 2000

(86) PCT No.: PCT/FR00/02175

§ 371 (c)(1),
(2), (4) Date: Jan. 11, 2002

(87) PCT Pub. No.: WO01/09255

PCT Pub. Date: Feb. 8, 2001

(30) Foreign Application Priority Data

Jul. 30, 1999 (FR) .......................................... 99 09946

(51) Int. Cl.$^7$ ........................ C09D 11/10; C08K 5/1565
(52) U.S. Cl. ........................ 523/160; 524/108; 524/111
(58) Field of Search ................. 523/160, 161; 106/31.57, 31.85; 524/383, 108, 111

(56) References Cited

U.S. PATENT DOCUMENTS

| | | | |
|---|---|---|---|
| 4,024,096 A | 5/1977 | Wachtel .................... 260/29.3 |
| 4,153,593 A | 5/1979 | Zabiak et al. ....... 260/29.6 ME |
| 4,155,767 A | 5/1979 | Specht et al. ................. 106/22 |
| 4,155,895 A | 5/1979 | Rohowetz et al. ..... 260/33.4 R |
| 4,166,044 A | 8/1979 | Germonprez et al. ....... 252/408 |
| 4,210,566 A | 7/1980 | Murray .................. 260/31.8 T |
| 4,260,531 A | 4/1981 | Wachtel et al. ......... 260/29.6 E |
| 4,567,213 A | 1/1986 | Bhatia et al. ................ 523/160 |
| 4,756,758 A | 7/1988 | Lent et al. .................... 106/22 |
| 4,880,465 A | 11/1989 | Loria et al. ................... 106/20 |
| 5,395,432 A | 3/1995 | Nelson et al. ............ 106/21 A |
| 5,510,415 A * | 4/1996 | Zahrobsky et al. ......... 524/506 |
| 5,637,139 A | 6/1997 | Morelos et al. .......... 106/31.37 |
| 6,247,801 B1 * | 6/2001 | Trauernicht et al. .......... 347/74 |

FOREIGN PATENT DOCUMENTS

| | | |
|---|---|---|
| EP | 0 289 141 | 11/1988 |
| EP | 0 735 120 | 10/1996 |
| FR | 2 460 982 | 1/1981 |
| GB | 2 277 094 | 10/1994 |
| GB | 2 298 713 | 9/1995 |
| JP | 6306316 | 11/1994 |
| JP | 2002020670 A * | 1/2002 |
| SU | 1509388 | 9/1989 |
| WO | WO 96/23844 | 8/1996 |

OTHER PUBLICATIONS

Leach, R.H. and Pierce, R.J.; The Printing Ink Manual 5$^{th}$ Edition, Blueprint, London, 1993 (p. 207).*
English Translation of SU 1509388.*

* cited by examiner

*Primary Examiner*—Callie Shosho
(74) *Attorney, Agent, or Firm*—Pearne & Gordon LLP

(57) ABSTRACT

Ink composition, in particular for continuous deflected ink jet printing comprising:

a binder one or several dyes and/or pigments, and a solvent in which the said solvent comprises at least 10% by weight—in relation to the total weight of the ink—of 1,3-dioxolane, at least 5% by weight of one or several other organic compounds that can dissociate the ionisable species in the ink, and less than 5% water.

16 Claims, No Drawings

INK COMPOSITION FOR INK JET PRINTING

DESCRIPTION

The invention concerns an ink composition, for marking on all sorts of substrates and objects, whose properties are particularly suited to marking or printing by a liquid jet on a very wide range of substrates.

Ink jet printing is a well known technique, which allows all sorts of objects to be printed, marked or decorated, at high speed, and without these objects contacting the printing device, with variable messages as desired, such as bar codes, sell by dates, etc., even on substrates that are not flat.

Ink jet printing systems can be broken down into two major techniques: "DOD" (Drop on Demand) or "CJ" (Continuous Jet).

We are particularly interested in this second technique and, more particularly, the continuous deflected jet technique.

Projection by continuous deflected jet consists in sending the ink, under pressure, into a cavity containing a piezoelectric crystal, from where the ink escapes via an orifice (nozzle) in the form of a jet. The piezo-electric crystal, vibrating at a given frequency, causes disruptions in the pressure of the ink jet, which oscillates and progressively breaks up into spherical droplets. An electrode, located in the path of the jet, at the point where the jet breaks up, makes it possible to confer an electrostatic charge to these droplets, if the ink is conductive. The droplets charged in this manner are deflected in an electric filed and allow printing.

This type of ink jet projection enables marking, without contact, at high throughput speed on objects that are not necessarily flat and with the possibility of changing the message at will.

Ink compositions that are suitable for projection by continuous deflected jet must meet a certain number of criteria that are inherent to this technique, relating to, amongst other things, the viscosity, the electrical conductivity, the solubility in a solvent for cleaning, the compatibility of the ingredients, the correct wetting of the substrates that need to be marked, etc.

In addition, these inks must dry rapidly, be capable for passing through the nozzle without blocking it, have very good jet directional stability and allow easily cleaning of the printing heads.

The ingredients used in present ink compositions for continuous deflected ink-jet printing are organic or inorganic products, colouring materials such as dyes or pigments, resins and binders, in one or several more or less volatile solvents or in water, and, if appropriate, one or several conductivity salts, as well as diverse additives.

The conductivity salt(s) give the ink the conductivity required for electrostatic deflection.

The additives include surfactants, which modify the wetting or penetrating power of the ink, in particular those that modify or regulate the static or dynamic surface tension, such as Fluorad® FC 430 from the 3M® Company, agents that inhibit the corrosion induced by the salts mentioned above, or even additives that protect the ink against the proliferation of bacteria and other micro-organisms; these additives include biocides, bactericides, fungicides and others, which are particularly useful in inks that contain water, pH buffering agents, and antifoaming agents.

The colouring materials are called "dyes or pigments", depending on whether they are soluble or insoluble in the solvent used.

Pigments, by nature insoluble, are therefore dispersed and may be opaque or not opaque. They give the ink its colour, its opacity, or specific optical properties, such as fluorescence (c.f. patents or patent applications U.S. Pat. No. 4,153,593, U.S. Pat. No. 4,756,758, U.S. Pat. No. 4,880,465, EP-A-0,289,141, U.S. Pat. No. 5,395,432, GB-A-2,298, 713). In certain cases, the dyes themselves provide sufficient conductivity to the ink so that there is no need to add a conductivity salt. The dyes known as C. I. Solvent Black 27, 29, 35 and 45 are examples.

The binder(s) or resin(s) used are mainly solid, polymeric compounds, and their choice is dictated by their solubility in the chosen solvents and their compatibility with the dyes and the other additives, but also and, above all, as a function of the properties that they give the ink film, once it has dried. Their major function is to allow the ink to adhere to the maximum number of substrates or to adhere to specific substrates, for example non-porous substrates. They also make it 0.5 possible to confer adequate viscosity to the ink for the formation of the droplets from the jet and they provide the ink, or rather the marking obtained, with most of its physical and/or chemical resistance properties.

The solvent used in these inks is most commonly a mixture comprising, firstly, a majority amount of volatile, not very viscous solvents, which allow rapid drying of the marking and enable the viscosity to be adjusted to the desired value, for example from 2 to 10 mPa.s and, secondly, more viscous and less volatile solvents that dry more slowly, in lesser amounts, in order to prevent the ink drying in the nozzle during stoppages to the printing device.

The volatile solvents used most frequently are low molecular weight alcohols, ketones or esters, as described in patents U.S. Pat. No. 4,567,213, U.S. Pat. No. 5,637,139, and one may cite as principal examples of these solvents methanol, ethanol, 1- and 2-propanol, acetone, methyl ethyl ketone (MEK), methyl isobutyl ketone, ethyl acetate and tetrahydrofuran.

U.S. Pat. No. 4,210,566 describes an ink mainly based on n-propyl acetate.

Tetrahydrofuran is cited in patent U.S. Pat. No. 4,155,767 as the main constituent of the solvent in an ink for ink jet printing (40 to 85%).

U.S. Pat. No. 4,166,044 describes an ink without binder, in which the solvent comprises water (10 to 35%), an alcohol (6 to 25%) and an organic compound, chosen, for example, in a general manner, from cyclic ethers. This ink has all of the disadvantages associated with the presence of water.

Finally, document JP-A-63 06316 describes an ink composition for ink jet printing whose solvent is water mixed with another solvent, chosen from 14 other compounds, including 1,3-dioxolane.

The less volatile solvents whose role is to slow down drying are most commonly ketones, such as cyclohexanone, glycol ethers, cited in the documents U.S. Pat. No. 4,024,096 and U.S. Pat. No. 4,567,213, acetals, such as tetrahydrofuran or dioxane, described in the document U.S. Pat. No. 4,155, 767, dimethyl formamide or dimethyl sulphoxide (U.S. Pat. No. 4,155,895), lactones (EP-A-0,735,120), glycols (WO-A-96 23 844) and even aliphatic hydrocarbons, which have an additional role of penetrating oil films (U.S. Pat. No. 4,166,044) or even water, on its own or in combination with the other solvents cited above. In this respect, the reader may refer to documents U.S. Pat. No. 4,153,593, GB-A-2,277, 094 and FR-A-2,460,982.

Generally, the principal or majority solvents in inks for continuous deflected ink jet projection must meet a certain number of criteria, in particular:

They must be sufficiently volatile for the ink to dry rapidly on the substrate that is to be marked, but not too volatile, in order to avoid too rapid evaporation in the printing device.

Their solvent power in relation to the ink binders, dyes or pigment dispersions, and in relation to the substrates to be printed, must allow the ink to be conferred with good adhesion.

They must be able to maintain the ionic species (salts) dissociated, which confers electrical conductivity to the ink.

Their effect on human health, in other words their toxicity, noxiousness, irritant character and flammability, must be kept to a minimum.

They must be able to maintain any inks that could be ingested in a sterile condition.

None of the solvents, called principal or majority solvents, normally used at present in inks for continuous ink jet printing simultaneously meet all of the criteria mentioned above.

Thus, methanol is toxic and has mediocre solvent power; ethanol is not sufficiently volatile and its solvent power is not high enough; ethyl acetate and the other acetates have an extremely strong odour, which is a principal defect in numerous applications; acetone is too volatile, with a very low flash point (−18° C.); MEK (methyl ethyl ketone) has adequate solubility and has good solvent power, but is an irritant, has an odour and is highly flammable with a flash point of −9° C. and, moreover, it is forbidden in the regulations of certain countries; THF (tetrahydrofuran) has higher volatility that methyl ethyl ketone, since its boiling point is 10° C. less than that of MEK, but its flash point of −17° C. is almost as low as that of acetone, and it can form explosive peroxides, it is an irritant like MEK and inks containing more than 25% have to be labelled as irritants.

There is therefore an unsatisfied need for an ink composition that is suitable, in particular, for continuous deflected ink jet printing, whose solvent meets, simultaneously, amongst other things, all of the criteria mentioned above, and as a consequence of which, the ink is provided with the desired properties, and the requirements, in particular the regulatory requirements regarding toxicity, flammability and protection of the environment, are met.

It would be useful to have an ink that has all of the advantages of methyl ketone, without any of the disadvantages.

There is also a need for an ink that is suitable, in particular, for ink jet printing that allows rapid marking of all types of objects with different surface characteristics, whether porous or not.

The ink must, in addition, provide marking that has good adhesion and good resistance to chemical attack and, in a general manner, have all of the properties normally required in inks for ink jet printers, in particular for printers using the continuous ink jet technique; viscosity, resistivity, etc.

The ink must, moreover, dry as quickly as possible, in order to allow high speed marking.

The aim of the invention is therefore to provide a suitable ink composition, in particular for continuous deflected ink jet printing, that meets, amongst other things, all of the criteria and requirements mentioned above, and which has none of the disadvantages, limitations, faults or vices of ink jet compositions of the prior art, and which overcomes the problems of ink compositions of the prior art, in particular regarding the type of solvents that they contain.

This aim and others are achieved, in accordance with the invention, by an ink composition comprising:
    a binder
    one or several dyes and/or pigments, and
    a solvent
in which the said solvent comprises at least 10% by weight-in relation to the total weight of the ink-of 1,3-dioxolane, at least 5% by weight of one or several other organic compounds that can dissociate the ionisable species in the ink, and less than 5% water.

In order to avoid any ambiguity, since the name dioxolane has commonly been given to two different products, the 1,3-dioxolane discussed here has the basic formula $C_3H_6O_2$ and has been assigned the CAS number (646-06-0).

Its schematic formula is as follows:

The invention is based on the surprising observation that 1,3-dioxolane may be used in the formulation of an ink that is particularly suited to continuous ink jet projection, and that this is possible without adding water to the formulation. In fact, the problems that arise in ink compositions for continuous deflected ink jet printing are extremely specific, so much so that even analogous solutions that could be adopted in ink compositions used in other techniques cannot be transposed, in an immediate and direct manner, to ink compositions for continuous ink jet printing.

Even more so, the possible use of dioxolane in compositions that are even more distant, such as paint compositions-necessarily opaque, unlike ink compositions-absolutely do not allow one to conclude that dioxolane could be suitable for a very specific use in an ink and, even more specifically, in an ink for continuous deflected ink jet printing.

It did not obviously follow from known compositions that the choice of 1,3-dioxolane, from the multiplicity of organic solvents that exist, could lead to an ink that meets all of the criteria, requirements and needs mentioned above, especially in relation to the type of solvent. The use of 1,3-dioxolane, in such ink compositions, has neither been described nor suggested in the prior art, where the only ink composition for ink jet printing cited that could possible contain 1,3-dioxolane, comprises a solvent or vehicle mainly comprising water and 1,3-dioxolane in minor quantities and only as an option. However, as has been mentioned above, this composition requires water in notable quantities in order to have the properties described and to be correctly dissolved.

On the other hand, the ink composition according to the invention contains a very small amount of water, less than 5% and, preferably, less than 1%.

The ink composition according to the invention may even be considered as being exempt of water. In fact, the water that is present is only water that is introduced as an impurity in the various components of the ink. The higher the degree of purity of the selected components, the lower the water content.

The low level or absence of water in the ink composition according to the invention favours high speed printing, in which very high evaporation speeds are required.

The criteria and requirements defined as regards the properties of a solvent for an ink composition for continuous ink jet projection are met by 1,3-dioxolane, since:
    Its boiling point is 75° C., which is near to the boiling points of ethanol and methyl ethyl ketone.
    Its volatility is 3.4 (that of butyl acetate is 1), which is very close to that of methyl ethyl ketone, which is 3.7.

Its capacity to dissolve most polymers is also very useful in order to obtain good adhesion on the largest variety of substrates that need to be marked.

It completely dissolves polystyrene, polymethyl methacrylate, polysulphone, polycarbonate, styrene-butadiene-styrene (SBS) type elastomeric, thermoplastic rubbers.

It softens to a very high extent poly(phenylene oxide), poly(vinyl chloride), certain polyurethanes and acrylonitrile-butadiene-styrene (ABS) copolymers.

It swells ethylene-propylene-diene monomer (EPDM) elastomers, polyethylene terephthalate (PET) and ethylene-vinyl acetate copolymers.

It also dissolves a wide range of resins or polymers that may be used as binders in the ink and which ensure adhesion on the substrates that need to be marked.

Its ability to dissolve dyes, in particular C. I. type solvent dyes, is as good as that of methyl ethyl ketone.

1,3-dioxolane is a flammable product with a flash point of 2° C., but it is neither noxious nor an irritant. Its odour is neither strong nor disagreeable.

1,3-dioxolane is therefore better than the most common principal solvents, used up till now, in ink compositions for continuous ink jet projection.

1,3-dioxolane is, in fact, more useful than:

Methanol, which is toxic and whose solvent power is much lower.

Ethanol, which is less volatile and whose solvent power is much lower.

Ethyl acetate, or the other acetates, which have a very strong odour.

Acetone, which is too volatile, and has a very low flash point (−18° C.).

Methyl ethyl ketone, which is an irritant, and has a lower flash point (−9° C.).

More precisely, compared to methyl ethyl ketone (or MEK), 1,3-dioxolane is less odorous, less noxious and less irritant, almost as volatile, and has a very similar solvent power.

Thanks to 1,3-dioxolane and according to the invention, it is possible, in a surprising manner, to formulate inks that are genuinely free of methyl ethyl ketone, and which therefore do not have the disadvantages inherent in these inks, but which have, however, almost all of the advantages of methyl ethyl ketone.

In particular, the inks according to the invention are very stable, due to the 1,3-dioxolane.

The ink composition according to the invention and, more precisely, the solvent included in this ink, contains, in addition, at least 5% by weight, compared to the total weight of the ink, of another organic compound-in other words an organic compound that is different to 1,3-dioxolane-which is capable of dissociating the ionisable species, in particular salts and notably conductivity salts, which are usually required in inks for continuous deflected ink jet printing.

In fact, the dissociative power of 1,3-dioxolane is not sufficient for this solvent to be used on its own, and for this reason it must be combined according to the invention with a second solvent in order to obtain the necessary conductivity, in particular for its use in continuous ink jet printing.

This type of combination does not adversely affect the advantageous properties of 1,3-dioxolane, mentioned above, and provides the dissociative power required for the preferred use that is made of the ink in continuous deflected ink jet printing and, in particular, makes it possible to dissociate the conductivity salts which are usually required in inks for continuous deflected ink jet printing.

In other words, it can be said that dioxolane, without water and combined with a solvent that can dissociate ions, ensures both adhesion on plastic or rubber materials, "projectability" by continuous deflected ink jet, and fast evaporation, without the disadvantages associated with the presence of water, in other words less good formation of ink films.

Preferably, the ink composition according to the invention comprises between 10 and 85% by weight of 1,3 dioxolane, and even more preferably between 35 and 80% by weight. The higher the 1,3-dioxolane content in the composition, the more one benefits from the advantages it offers.

Preferably, the ink composition according to the invention comprises between 5 and 50% by weight of one or several other organic compound(s), and even more preferably, between 10 and 40% by weight of the other organic compound(s).

The said other organic compound(s), part of the solvent and in addition to the dioxolane, are chosen, for example, from alcohols, in particular low molecular weight alcohols such as, for example, aliphatic alcohols, ketones, alkylene glycol ethers and esters, dimethyl formamide, N-methylpyrrolidone, and any other compounds known to those skilled in the art for their ability to dissociate ionisable or dissociable species into ions, such as salts; and their mixtures: compounds that have this ability to dissociate these species are generally taken to mean liquid compounds that produce solutions that can conduct electricity when the said species are present.

Preferably, the other organic compounds) used as part of the solvent are organic solvents whose volatility is less than 1,3-dioxolane.

Preferably, this or these compound(s) have, in addition, the ability to dissolve the other ingredients of the ink, notably the binder, the colouring materials, the additives, etc., and/or retard the evaporation of the ink compared to an ink that only contains 1,3-dioxolane as solvent.

The alcohols are, preferably, chosen from linear or branched aliphatic alcohols with 1 to 5 carbon atoms, such as methanol, ethanol, 1-propanol, 2-propanol, n-butanol, 2-butanol, t-butanol, etc.

The ketones are, preferably chosen from ketones with 3 to 10 carbon atoms, such as acetone, butanone (methyl ethyl ketone), 2-pentanone (methyl propyl ketone), and 2-methyl-4-pentanone (methyl isobutyl ketone).

The alkylene glycol ethers are chosen from monoalkylic ethers (in C1 to C6) or dialkylic ethers (in C1 to C6) of alkylene glycol comprising 1 to 10 carbon atoms in the alkylene chain, preferably ethylene or propylene glycol ethers, such as methoxy propanol.

The glycol ether esters are chosen, preferably, from esters of these with saturated aliphatic carboxylic acids with 1 to 6 carbon atoms, such as formic acid, acetic acid, propionic acid, butyric acid, valeric acid and caproic acid.

One may cite, for example, methoxy propyl acetate, butyl diglycol acetate, etc.

It has been observed that a solvent comprising a combination of 1,3-dioxolane and acetone as solvent confers inks with particularly rapid drying properties.

The ink composition according to the invention also comprises a binder comprising one or several polymer(s) and/or resin(s).

These polymers and/or resins are chosen, preferably, from methacrylic, vinylic, ketonic, phenolic, cellulosic, styrenic, epoxy, polyurethane and styrene acrylate resins and combinations of two or more of these resins.

Examples of these resins are as follows:

For acrylic, methacrylic and styrene acrylate resins, the Joncryl® range from JOHNSON POLYMER, the Acryloid® range from ROHM & HAAS, the SMA® range from ATOCHEM or the Neocryl® range from ZENECA.

For vinylic resins, the Hostaflex® range from the VIANOVA Company, the Vinylite® range from UNION CARBIDE or the Vinnol® range from WACKER.

For ketonic resins, the products commercialised by the HULS and BASF companies, such as the resins called AP and SK from HULS and the LAROPAL® resins from BASF.

For phenolic resins, the products commercialised by the VIANOVA Company under the trade name ALNOVOL®.

Amongst the cellulosic resins, such as nitrocellulose resins, ethylcellulose resins, aceto-propionates or acetobutyrates of cellulose, one may cite, for example, the products commercialised by the HERCULES or EASTMAN companies.

Amongst the epoxy resins, one may cite the Epikote® range commercialised by the SHELL Company or the Araldite range from CIBA.

Amongst the polyurethanes, one may cite the Surkopak® range from the MITCHANOL Company.

The proportion of binder in the ink composition according to the invention is generally from 0.1 to 30% by weight and, preferably, from 3 to 20% by weight.

The ink composition may, in addition, comprise one or several plastifier(s) (of the resin(s) or polymer(s) of the binder) chosen, for example, from plastifiers known to those skilled in the art and selected as a function of the binder used, comprising one or several polymer(s) and/or resin(s). One may cite, for example, as a plastifier, thermoplastic polyurethanes.

The solvent power of dioxolane makes it possible to easily incorporate such plastifying compounds into the composition according to the invention.

The plastifier(s) are generally present at a level of 0.1 to 20% by weight.

The dye(s) and/or pigment(s) may be chosen from any of the dyes or pigments that are suitable for the desired use, known to those skilled in the art; some of these dyes or pigments have already been cited above.

Generally, dyes or pigments known as "C. I. Solvent Dyes" and "C. I. Pigments" are chosen. As an example, amongst the most common pigments and dyes, one may cite the C. I. Solvent Black 29, C. I. Solvent Black 7, C. I. Solvent Black 35, C. I. Solvent Blue 70, C. I. Solvent red 124, and dispersions of Pigment Blue 60 or Pigment Blue 15.

The quantity of dye and/or pigment is generally from 0.1 to 20% by weight and preferably 3 to 10%.

Thanks to the ability of 1,3-dioxolane to dissolve higher amounts of the dye(s) than normal solvents, it is possible, in particular, in the case of a fluorescent dye, to obtain particularly fluorescent inks, in other words inks that are visible under weak UV lighting.

The composition according to the invention may, in addition, if appropriate, comprise at least one conductivity salt.

In fact, when the ink is to be used in continuous jet printing, it must have sufficient electrical conductivity, preferably around 500 to 2000 µs/cm, or more.

The products that provide the ink with the necessary conductivity for projection by continuous jet are ionisable compounds, such as salts, although it is possible that the dyes (in fact, the pigments and solvents cannot provide conductivity to these inks), already present in the ink, provide sufficient conductivity to the ink so that there is no need to add an actual conductivity salt, these dyes being then necessarily salts; this is the case with compounds known as "C. I. Solvent Black 27, 29, 35 and 45" already cited.

However, it is often necessary to include, in the ink composition, a conductivity salt that is different to the dyes and which is generally chosen from alkali metal salts, alkaline earth salts and single or quaternary ammonium salts in the form of halides (chlorides, bromides, iodides and fluorides), perchlorates, nitrates, thiocyanates, formiates, acetates, sulphates, propionates, etc. These conductivity salts are thus present, if necessary, in the ink composition so that they confer to the ink the conductivity mentioned above: preferably, they are used at a level of 0.1 to 20% by weight and, even more preferably, from 0.1 to 10% by weight.

The composition according to the invention may, in addition, comprise one or several additives chosen from compounds that improve the solubility of certain of these components, the quality of printing, the adhesion, or even controlling the wetting of the ink on different substrates.

The additive(s) may be chosen, for example, from antifoaming agents, chemical stabilisers, UV stabilisers, surfactants, such as Fluorad® FC 430, inhibitors against salt corrosion, bactericides, fungicides and biocides, pH buffering agents, etc.

The additive(s) are used in very low amounts, generally less than or equal to 5% and sometimes as low as 0.01%, depending on whether it is an anti-foaming agent, a stabiliser or a surfactant.

Another aim of the invention is a process for marking objects, for example, porous or non-porous objects, by the projection onto these objects of an ink composition, as described above. The marking may, in particular, be carried out using the continuous deflected ink jet technique.

Another object of the invention is a substrate or support, for example, porous or non-porous, provided with marking using the ink composition, as described above. This substrate may be metal, for example, aluminium, steel (drink cans), glass (glass bottles), wood, ceramic, paper, cardboard, synthetic polymers ("plastics") such as PVC and PET, polyolefins such as polyethylene (PE) and polypropylene (PP), "Plexiglas", or any other porous or non-porous substrate. It should be noted that due to the ability of 1,3-dioxolane to dissolve numerous substrates, the adhesion of the marking obtained according to the invention is excellent, even on substrates considered as difficult, such as polyethylene, etc.

The invention will be more clearly understood by reading the following description of the embodiments of the invention, which are given as illustrative examples and are in no way limitative.

The following ink compositions, according to the invention, were prepared by mixing the products mentioned in Table I, in the proportions indicated. The Table also details the viscosity and the conductivity of the inks obtained.

TABLE 1

| CONSTITUENTS | EXAMPLES | | | | | |
|---|---|---|---|---|---|---|
| (percentage by weight) | N° 1 | N° 2 | N° 3 | N° 4 | N° 5 | N° 6 |
| 1,3-dioxolane (>99% pure) | 40 | 46 | 34 | 45.5 | 80.7 | 60 |
| Ethanol 99% | 38.9 | | 33.4 | 27.2 | | |

TABLE 1-continued

| CONSTITUENTS (percentage by weight) | N° 1 | N° 2 | N° 3 | N° 4 | N° 5 | N° 6 |
|---|---|---|---|---|---|---|
| Methyl ethyl ketone |  | 46.4 |  |  |  |  |
| Methoxy propyl acetate |  |  | 10 |  |  |  |
| Methoxy propanol |  |  |  | 9 |  |  |
| N-methyl pyrrolidone |  |  |  |  | 11.5 |  |
| Acetone |  |  |  |  |  | 25 |
| 2-propanol |  |  |  |  |  | 3 |
| Fluorescent orange dye (1) | 10 |  |  |  |  |  |
| Fluorescent brightener (2) |  | 1.5 |  |  |  |  |
| Solvent Red 124 |  |  | 4.5 |  |  |  |
| Solvent Black 7 |  |  |  | 4.5 |  |  |
| Vinylic dispersion of Pigment Blue 60 |  |  |  |  | 3 |  |
| Solvent Black 29 |  |  |  |  |  | 5 |
| Acrylic resin (3) | 8 |  |  |  |  |  |
| Vinylic resin (4) |  | 5 |  |  |  |  |
| Phenolic resin (5) |  |  | 17 |  |  |  |
| Ketonic resin (6) |  |  |  | 11 |  |  |
| Nitrocellulose |  |  |  |  |  | 6.9 |
| Thermoplastic polyurethane | 2 |  |  |  |  |  |
| Lithium nitrate | 1 |  | 1 |  | 1.7 |  |
| Potassium thiocyanate |  | 1 |  |  |  |  |
| Ammonium acetate |  |  |  | 2.7 |  |  |
| Surfactant (7) | 0.1 | 0.1 | 0.1 | 0.1 | 0.1 | 0.1 |
| Viscosity (MPa · s) | 4.4 | 4.0 | 4.5 | 4.0 | 4.1 | 5.0 |
| Conductivity (μS/cm) | 960 | 800 | 855 | 700 | 800 | 850 |

(1) Solid solution of rhodamine derivatives and polyester resin
(2) C. I. Fluoroscent Brightener 184
(3) Joncryl® 68 from Johnson Polymer
(4) VMCH from Union Carbide
(5) VIANOVA® (ALNOVOLO) novolak type phenolic resin
(6) Ketonic resin from HULS.
(7) Fluroad® FC 430 surfactant from 3M®.
All of the percentages are by weight.

According to the invention, each of the ink compositions in Table 1 gives enamel like, glossy films, which have very good adhesion to a wide variety of substrates. They do not contain more than 1% water, and this is only due to water present as inevitable impurities, for example in the alcohols or the 1,3 dioxolane.

The inks prepared in this manner were tested in Jaime 1000, series 4 continuous deflected ink jet printers, manufactured by the IMAJEO Company, and enabled excellent quality prints to be obtained.

EXAMPLE 1

The ink produced is a fluorescent orange ink, mainly applicable to postal indexing.

Its adhesion is excellent on all types of substrates used for packing various types of mail.

The solvent power of dioxolane makes it possible to incorporate a plastifying polyurethane resin.

EXAMPLE 2

This ink is a colourless ink and visible under UV lighting, and may be used for "security" marking. It is particularly fluorescent, in other words visible under weak UV lighting, thanks to the ability of dioxolane to dissolve the fluorescent dye in higher quantities.

EXAMPLE 3

This red ink has particularly good adhesion, even on difficult substrates such as polyethylene.

EXAMPLE 4

This black ink is useful for marking bar codes, thanks to its absorption of red and infrared light. Its excellent stability is obtained thanks to the presence of dioxolane.

EXAMPLE 5

This blue ink has particularly good adhesion on PVC type substrates.

EXAMPLE 6

This black ink, suitable for multiple uses, dries particularly quickly, thanks to the combination of acetone and dioxolane solvents.

With the exception of the inks from examples 2 and 5, each of these inks only requires an F="high flammable" label. The inks from examples 2 and 5 contain, respectively, methyl ethyl ketone or N-methylpyrrolidone and must be labelled Xi=irritant, according to European legislation.

What is claimed is:

1. Ink composition comprising:
   a binder
   one or several dyes and/or pigments, and
   a solvent in which the said solvent comprises at least 10% by weight-in relation to the total weight of the ink of 1,3-dioxolane, at least 5% by weight of one or several other organic compounds that can dissociate ionisable species in the ink, and less than 5% water and at least one conductivity salt at a level of 0.1 to 20% by weight.

2. Ink composition according to claim 1, comprising from 10 to 85% by weight of dioxolane.

3. Ink composition according to claim 1, comprising from 5 to 50% by weight of the said other organic compounds(s).

4. Ink composition according to claim 1, in which the said other organic compound(s) are selected from the group consisting of alcohols, ketones, alkylene glycol ethers, alkylene glycol esters, alkylene glycol ether esters, dimethyl formamide, N-pyrrolidone and any other compounds known for their ability to dissociate ionisable species and, if appropriate, their properties of dissolving the other ingredients in the ink composition and/or to slow down the evaporation of the ink; and their mixtures.

5. Ink composition according to claim 4, in which the said other compound(s) are linear or branched aliphatic alcohols with from 1 to 5 carbon atoms, ketones with from 3 to 10 carbon atoms, monoalkylic ethers with 1 to 6 carbon atoms in the alkyl group or dialkylic ethers with 1 to 6 carbon atoms in each alkyl group of alkylene glycols with 1 to 10 carbon atoms in the alkylene chain, and the alkylene glycol ether esters formed with saturated aliphatic carboxylic acids with 1 to 6 carbon atoms.

6. Ink according to claim 5, in which said alkylene glycols are selected from the group consisting of ethylene glycol and propylene glycol.

7. Ink composition according to claim 1, in which the said binder comprises one or several resins or polymers.

8. Ink composition according to claim 7, in which the said resin(s) and/or polymer(s) are selected from the group consisting of the methacrylic, vinylic, ketonic, phenolic, cellulosic, styrenic, epoxy, polyurethane and styrene-acrylate resins, and the combination of two or more of these.

9. Ink composition according to claim 1, comprising 0.1 to 30% by weight of binder.

10. Ink composition according to claim 1, comprising, in addition, one or several plastifiers at a level of 0.1 to 20% by weight.

11. Ink composition according to claim 1, in which the said dye(s) and/or pigment(s) are chosen from dyes and pigments known as "C. I. Solvent Dyes" and "C. I. Pigments".

12. Ink composition according to claim 1, comprising 0.1 to 20% by weight of dye(s) and/or pigment(s).

13. Ink composition according to claim 1, in which the said conductivity salt is selected from the group consisting of alkali metal salts, alkaline earth salts and single or quaternary ammonium salts, in the form of halides, perchlorates, nitrates, thiocyanates, formiates, acetates, sulphates and propionates.

14. Ink composition according to claim 1, comprising, in addition, one or several additives selected from the group consisting of anti-foaming agents, chemical stabilisers, UV stabilisers, surfactants, inhibitors to prevent salt corrosion, bactericides, fungicides, biocides, and pH buffering agents.

15. Process for marking objects by the projection of ink onto-these objects, whereby the projected ink is an ink composition according to claim 1.

16. Process according to claim 15, whereby the marking is achieved by the technique of continuous deflected ink jet.

* * * * *

UNITED STATES PATENT AND TRADEMARK OFFICE
CERTIFICATE OF CORRECTION

PATENT NO. : 6,869,986 B1
DATED : March 22, 2005
INVENTOR(S) : Vincent Millot et al.

It is certified that error appears in the above-identified patent and that said Letters Patent is hereby corrected as shown below:

Column 10,
Line 44, after "are" insert -- selected from the group consisting of --.

Signed and Sealed this

Twenty-eighth Day of June, 2005

JON W. DUDAS
*Director of the United States Patent and Trademark Office*